United States Patent [19]

Sznaider

[11] Patent Number: 5,255,190
[45] Date of Patent: Oct. 19, 1993

[54] SOFTWARE METHOD FOR ENHANCING IR SATELLITE SENSOR CLOUD IMAGES

[75] Inventor: Ronald J. Sznaider, Circle Pines, Minn.

[73] Assignee: Kavouras, Inc., Minneapolis, Minn.

[21] Appl. No.: 586,144

[22] Filed: Sep. 21, 1990

Related U.S. Application Data

[63] Continuation-in-part of Ser. No. 359,351, May 31, 1989, abandoned.

[51] Int. Cl.[5] ............ G06F 15/54; G06G 7/48; H04N 1/46
[52] U.S. Cl. ............ 364/420; 364/578; 358/81
[58] Field of Search ............ 364/420, 578; 358/89, 358/103; 342/460

[56] References Cited

U.S. PATENT DOCUMENTS 4,364,085 12/1982 Dalke ............ 358/81
5,075,856 12/1991 Kneizys et al. ............ 364/420

OTHER PUBLICATIONS

*Bulletin of the American Meteorological Society.* "Meteorological Data Fields In Perspective", vol. 6, No. 7, Jul. 1985 by A. F. Hasler et al.
Satellite Derived Cloud Top Estimation for Operational use at the National Severe Storms Forecast Center, Jan. 9–12, 1989 by P. Smith et al.
Application of Scientific Visualization to Fluid Dynamic Problems, 1988 David E. Edwards.
Determination of Thunderstorm Heights and Intensities from GOES Infrared Data, by Robert F. Adler et al.
The Visualization Challenge in the Physical Sciences, *Computer in Science* Jan./Feb. 1988 by Robert S. Wolff.
*Bulletin of the American Meteorological Society,* vol. 67, No. 11, Nov. 1986 "Computer-Generated Imagery for 4-D Meteorological Data".
World Meteorological Organization, "Technical Note No. 166, Quantitative Meteorological Data From Satellites", by Christopher M. Hayden et al.
Chapter 2 "Wind Derivation from Geostationary Satellites" by Lester F. Hubert.

*Primary Examiner*—Roy N. Envall, Jr.
*Assistant Examiner*—Khai Tran
*Attorney, Agent, or Firm*—Haugen and Nikolai

[57] ABSTRACT

To improve the quality of the raster scan display on a video monitor or two-dimensional infrared satellite cloud imagery so as to provide it with a three-dimensional appearance, the satellite data is computer processed to first convert from satellite image to Cartesian coordinates and then combined with localized weather information obtained from ground observations and radiosonde data, such weather information including temperatures, humidity readings, pressures and other earth conditions at gridded locations within predetermined global regions. In this fashion, the satellite cloud base and cloud top temperatures are determined and converted into altitude profiles at each of 640×480 pixel locations comprising the satellite imagery. The resulting raster scan bit stream is representative of a 3-D display of the cloud formations. By using time-lapse animation, a four-dimensional presentation, i.e., one including time as a factor, can be displayed.

15 Claims, 7 Drawing Sheets

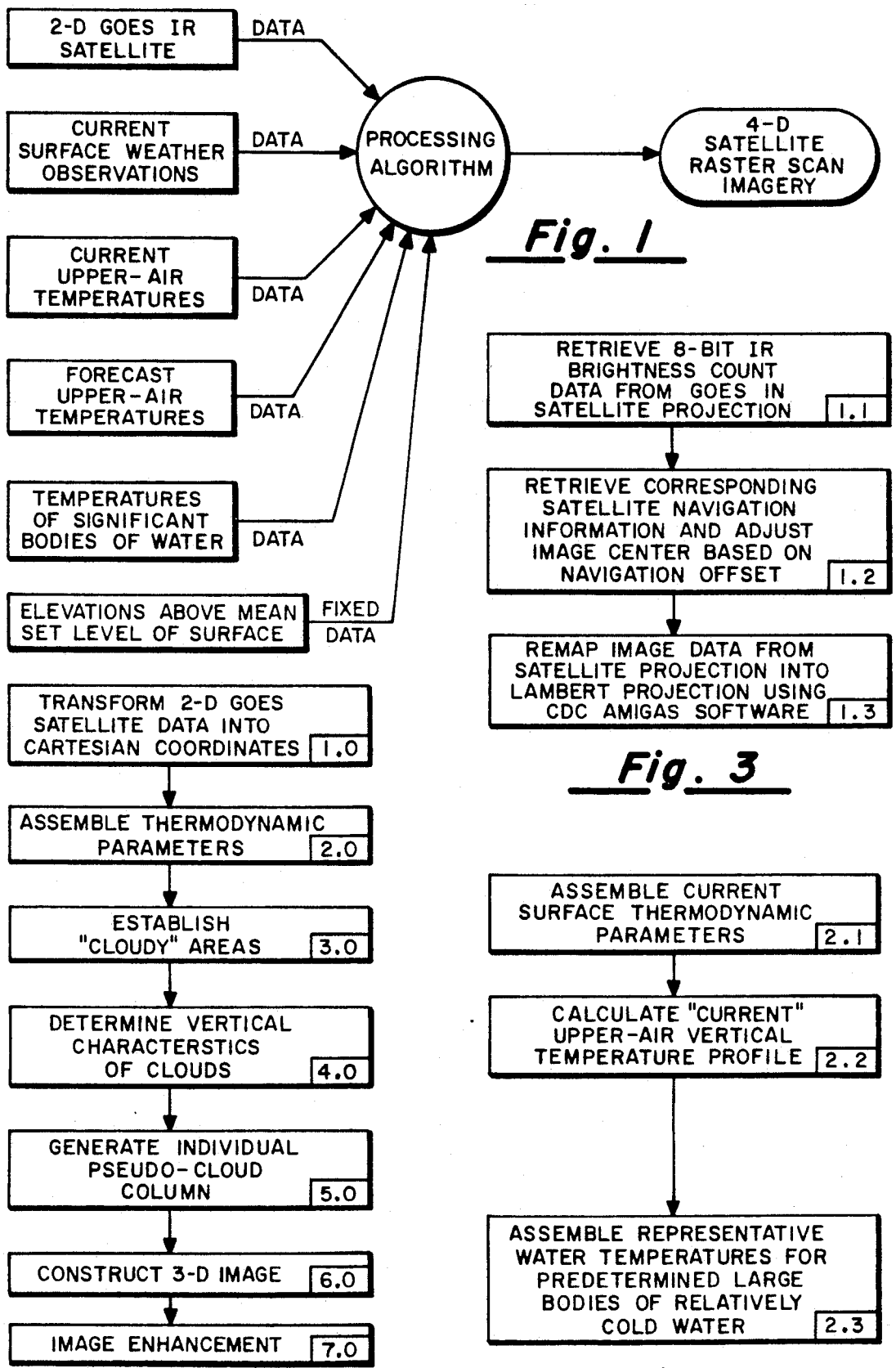

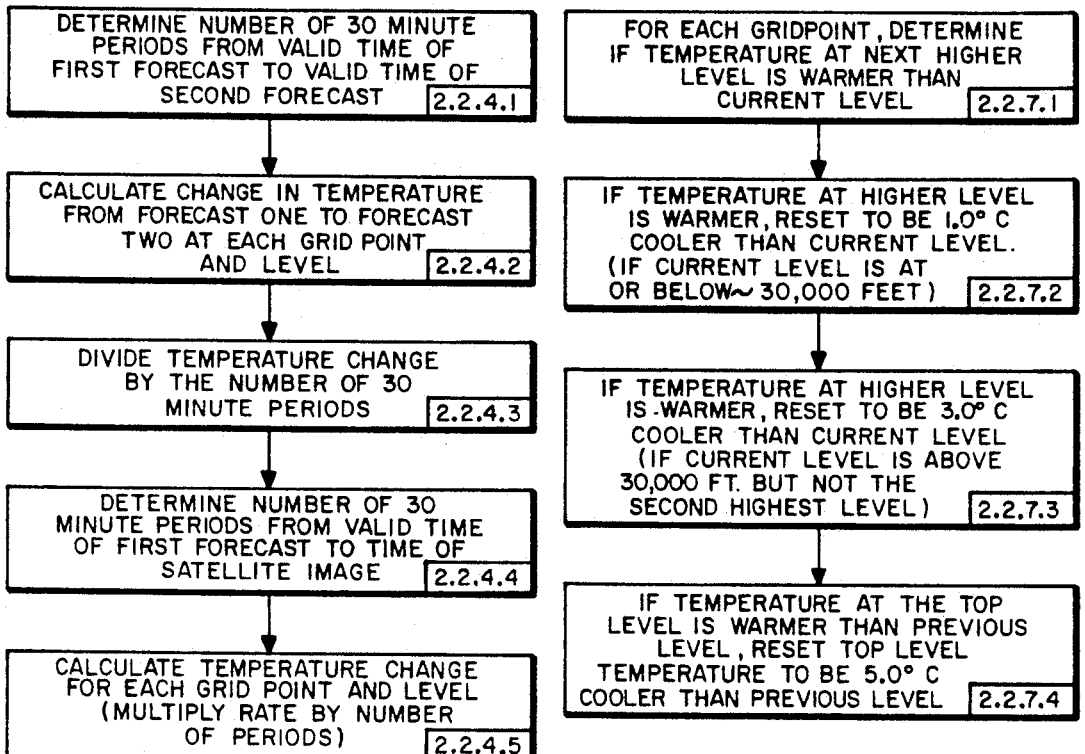
Fig. 7
Fig. 8
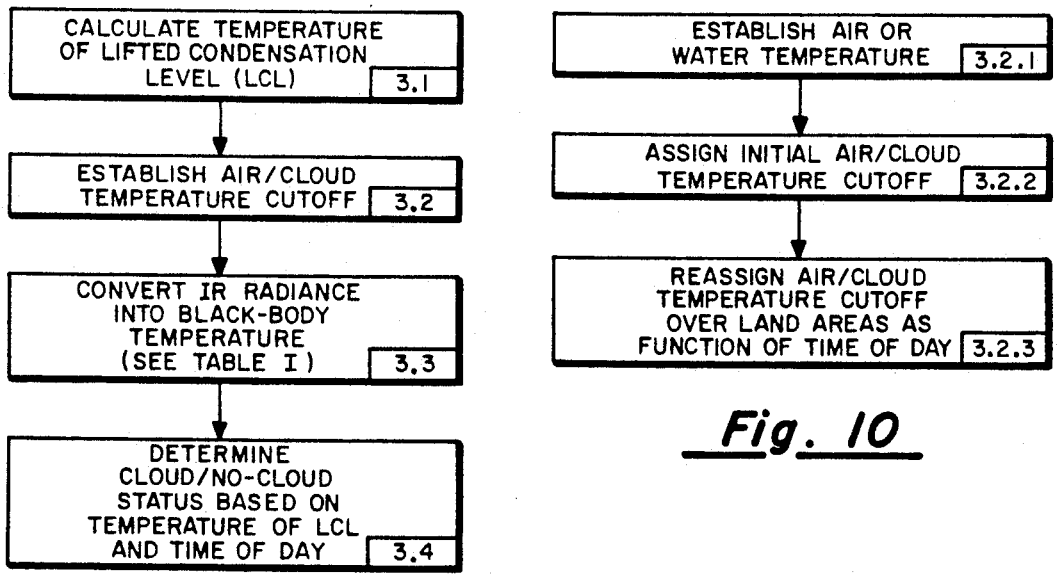
Fig. 9
Fig. 10

FOR LAND AREAS

CALCULATE AIR TEMPERATURE VIA BILINEAR INTERPOLATION OF SURROUNDING FOUR GRID POINTS  3.2.3.1

CALCULATE SUNRISE/SUNSET TIME FOR IMAGE CENTER LAT/LON  3.2.3.2

*Fig. 11*

SET CUTOFF TEMPERATURE AS FOLLOWS:
  (a) DAYTIME (TWO HOURS AFTER SUNRISE TO ONE HOUR BEFORE SUNSET)
      CUTOFF = MEAN OF AIR TEMP AND (LCL TEMP – 3.0 DEG C)
  (b) EVENING TWILIGHT (FROM ONE HOUR BEFORE SUNSET TO SUNSET)
      CUTOFF = WEIGHTED MEAN OF AIR TEMP AND LCL TEMP – 3.0 DEG C
      THE WEIGHT OF THE AIR TEMP DECREASES AND WEIGHT OF LCL – 3.0 INCREASES AT RATE OF 0.2 DEG C PER 1/2 HOUR
  (c) NIGHTTIME (FROM SUNSET TO SUNRISE)
      CUTOFF = LCL TEMP – 3.0 DEG C
  (d) MORNING TWILIGHT (FROM SUNRISE TO TWO HOURS AFTER SUNRISE)
      CUTOFF = WEIGHTED MEAN OF AIR TEMP AND LCL TEMP – 3.0 DEG C
      THE WEIGHT OF THE AIR TEMP INCREASES AND WEIGHT OF LCL – 3.0 DECREASES AT RATE OF 0.1 DEG C PER 1/2 HOUR AFTER SUNRISE

OVER WATER AREAS

DETERMINE WHAT BODY OF WATER PIXEL IS LOCATED OVER  3.2.1.1

DETERMINE WATER TEMP AT THAT PIXEL LOCATION  3.2.1.2

CUTOFF = MEAN OF WATER TEMP AND LCL TEMP  3.2.1.3

*Fig. 12*

ASSIGN CLOUD TOP TEMPERATURE  4.1

ASSIGN CLOUD BASE TEMPERATURE  4.2

ASSIGN SURFACE TEMPERATURE AND ELEVATION WITHIN VERTICAL PROFILE  4.3

CALCULATE ALTITUDE OF CLOUD BASE AND NORMAL CLOUD TOPS  4.4

CALCULATE ALTITUDE OF INVERSIONS  4.5

CALCULATE ALTITUDE OF CONVECTIVE OVERSHOOTING TOP  4.6

*Fig. 13*

SOFTWARE METHOD FOR ENHANCING IR SATELLITE SENSOR CLOUD IMAGES

CROSS-REFERENCE TO RELATED

This application is a continuation-in part in application Ser. No. 07/359,351, filed May 31, 1989, (now abandoned) and entitled "SOFTWARE METHOD FOR SATELLITE CLOUD IMAGE ENHANCEMENT".

BACKGROUND OF THE INVENTION

I. Field of the Invention

This invention relates generally to the field of meteorology, and more particularly to a software method of processing two-dimensional (2-D), infrared (IR) cloud temperature data, gathered from a weather satellite, to a three-dimensional (3-D) video image which, through meteorological imaging time-lapse animation techniques, adds a fourth dimension (time) to greatly enhance the information content of the video display.

II. Discussion of the Prior Art

For well over a decade, IR imagery from Geostationary Operational Environmental Satellites (GOES) has been available for use in weather forecasting. The GOES satellites look down on cloud formations from an altitude of approximately 23,000 miles which tends to create a planar, 2-D picture of the earth. While showing paths of cloud movement, it conveys limited information relating to convective activity, cloud height, cloud overshoot, and other forms of turbulence important to forecasting and flight plan preparation. Moreover, the 11 micron window IR temperatures available from the satellite can be misinterpreted due to the presence of snow cover on the ground as the temperature emitted by the snow closely resembles cloud temperatures. Likewise, cold bodies of water may be misinterpreted as low clouds or fog when, in fact, the skies are clear in the area of question. This is because the cold water temperatures are in such contrast to warmer land areas. Thus, when converted to raster scan data for video display, the display fails to distinguish between clouds and snow-covered ground or very cold bodies of water. Thus, on a clear day, the video image may display what appears to be cloud cover when, in fact, it is the snow on the ground or a key cold body of water giving misleading information. Another drawback of conventional IR displays is that outbreaks of cold air near the surface, typically following an advancing cold front, may give the appearance of low cloud cover. That is because the conventional displays cannot distinguish between cold, cloud-free air and cold air where clouds do, in fact, exist.

OBJECTS

Accordingly, it is a principal object of the present invention to provide a more realistic and accurate video display of satellite-sensed cloud information.

Another object of the invention is to provide a software method of processing IR satellite image data in combination with weather information from other sources to improve the realism of the video display.

Still another object of the present invention is to provide a software method of processing GOES IR satellite imagery with high-resolution surface thermodynamic parameters in addition to water temperatures to aid in determining the existence of clouds and to determine the height of the cloud base at plural contiguous points in the region being displayed.

A further object of the invention is to provide a software method of deriving from IR satellite image data and interpolated observed surface and observed and forecasted upper-atmospheric (radiosonde) data, the height profile and movement of cloud formations at a large plurality of matrix locations to create raster scan information for video display.

SUMMARY OF THE INVENTION

In achieving the foregoing objects and advantages, satellite image coordinate IR temperature data comprising 1,820 horizontal lines of 8-bit values (256 shades) is converted to a Cartesian coordinate (Lambert Conformal projection) representation using a commercially available software program available through the Control Data Corporation (CDC) and referred by it as the AMIGAS software. Taking into account such parameters as the satellite characteristics, e.g., spin rate, number of elements per line, etc., and so-called "navigation parameters", which consist of information relating to the orbit and attitude of the satellite, as well as information regarding east-west centering of the earth in the image frame, a coordinate transformation between image and earth coordinate systems takes place.

Following the transformation of the 2-D GOES satellite data into Cartesian coordinates, a number of thermodynamic parameters from multiple sources are sampled, digitized and fed into a main-frame type digital computer for processing. Among the thermodynamic parameters which are utilized are the current surface air temperatures at various gridded locations on the map. Then through interpolation, fairly exact surface temperature information at each possible pixel location can be determined. In the same fashion, gridded values of surface dew point temperatures are gathered and interpolated so that the exact dew point temperatures at each such pixel location can be determined. Still other thermodynamic parameters factored into the enhancement algorithm include current "mandatory" and "significant" level radiosonde temperatures from which current temperatures at predetermined levels in the atmosphere can be determined, via log-pressure interpolation of the radiosonde data. These temperatures are adjusted using forecast information provided by the National Meteorological Center (NMC) such that a forecasted rate of temperature change, into the future, for each level can be calculated.

Next in the process, the location of "cloudy" areas is established by calculating the temperature of the Lifted Condensation Level (LCL). That information, together with water temperatures over large bodies of water, the surface air temperature, and the surface dew point temperature, is used to make a cloud/no-cloud determination at each pixel location.

When cloud presence is determined, the next step is to establish the vertical characteristics of that cloud. With cloud-top temperatures obtained from the transformed GOES IR data and theoretical cloud-base temperatures computed from the meteorological parameters which are sampled, it is possible to assign altitude values thereto. Once this is accomplished, individual pseudo-cloud columns at each pixel location are generated.

Finally, a 3-D image is constructed by processing the assembled image from top to bottom and converting same through a scaling/rotate subroutine to a raster scan bit stream for initial storage in computer memory and subsequent read-out to a CRT display. A convolution process is then applied to the image effectively highlighting certain cloud features.

DESCRIPTION OF THE DRAWINGS

FIG. 1 is a general software system diagram illustrating the input parameters which are computer processed to provide an enhanced 3-D satellite raster scan image of cloud formations within a predetermined region;

FIG. 2 is a general software flow diagram comprising the processing algorithm of FIG. 1;

FIG. 3 comprises a detailed flow diagram of the steps involved in block 1.0 in FIG. 2;

FIG. 4 is a more detailed block diagram of the steps performed in the operation of block 2.0 in FIG. 2;

FIG. 7 is a more detailed flow diagram of the operational steps carried out in performing the operation of step 1, 2.4 in FIG. 6;

FIG. 8 is a more detailed block diagram of the operational steps used in effecting the operation represented by block 2.2.7 in FIG. 6;

FIG. 9 is a more detailed block diagram of the steps for effecting the operations represented by step 3.0 in FIG. 2;

FIG. 10 is a more detailed block diagram of the steps for effecting the operations represented by step 3.2 in FIG. 9.

FIG. 11 is a more detailed flow diagram of the operational steps used in carrying out the operation of step 3.2.3 in FIG. 10 when over land area;

FIG. 12 is a more detailed block diagram of the operational steps for effecting the operations represented by step 3.2.3 in FIG. 10 when over water;

FIG. 13 is a more detailed flow diagram of the operational steps used in carrying out the operation of step 4.0 in FIG. 2;

DESCRIPTION OF THE PREFERRED EMBODIMENT

Figures 5, 6:
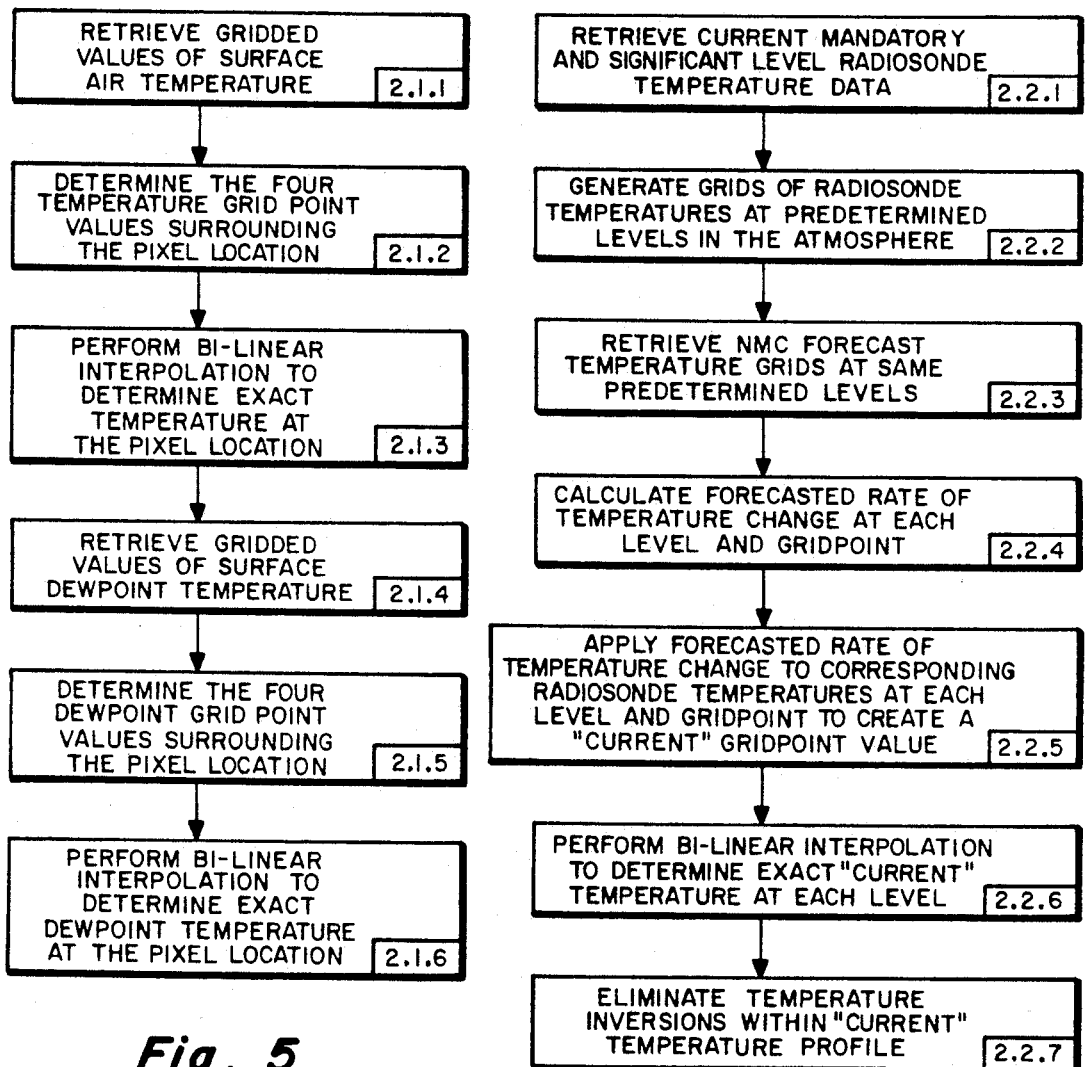
FIG. 5 is a more detailed flow diagram of the operational steps carried out in performing the operation of block 2.1 of FIG. 4.
FIG. 6 is a more detailed flow diagram of the operational steps carried out in performing the step 2.2 in FIG. 4.
Figure 14:
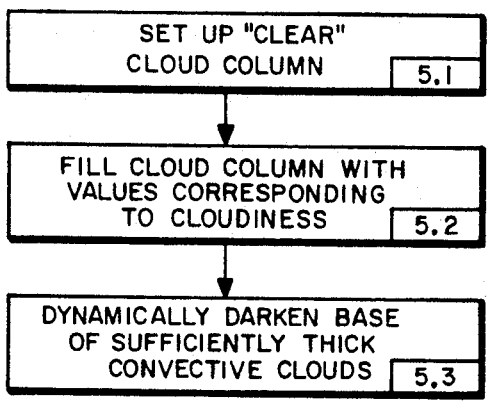
FIG. 14 is a more detailed flow diagram of the operational steps used to carry out step 5.0 in FIG. 2.
Figure 15:
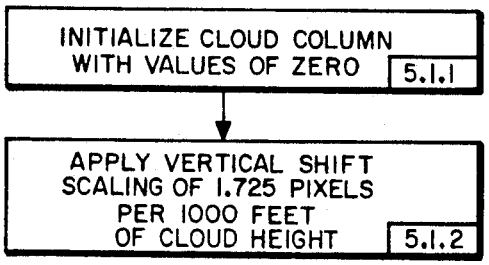
FIG. 15 is a more detailed flow diagram of the steps used in carrying out step 5.1 in FIG. 14.
Figure 17:
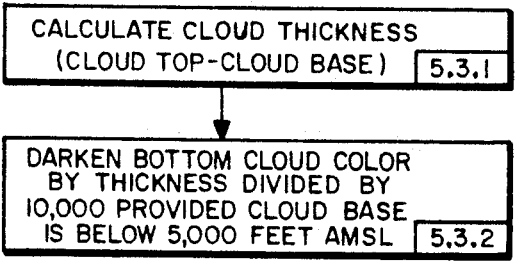
FIG. 17 is a more detailed block diagram of the steps for effecting the operations represented by step 5.3 in FIG. 14.

Referring to FIG. 1, illustrated is a system diagram showing the data inputs to the processing algorithm comprising the present software method for performing satellite cloud image enhancement. A high-speed digital computer is used to process the data and produce a 3-D satellite raster scan image for display on a video screen. With no limitation intended, the processing involved may be carried out on a CDC Cyber 840A Computer. As shown by block 10 in FIG. 1, one set of inputs to the process comprise 2-D IR temperature data available from the GOES satellite which, as those skilled in the art appreciate, comprises 1,820 horizontal lines of 8-bit values, the 8-bit values capable of representing 256 colors representing a full disc of the earth's atmosphere as viewed from a geostationary orbit. The 2-D satellite data is originally in satellite image coordinates. This satellite sensed IR data provides cloud top temperature information 24 hours per day at 30 minute intervals.

In addition to the data from the GOES satellite, the processing algorithm of the present invention also utilizes observed weather conditions on the earth's surface (block 12) including, temperature and dew point temperature, etc. Gridded values of the above information are generated using observations available via the Federal Aviation Agency (FAA) 604 circuit and the National Weather Service (NWS) domestic circuit utilizing Surecast ™ Regional Analyses available through Kavouras Inc. of Minneapolis, Minn., applicant's assignee.

A third input to the processing algorithm (block 14) pertains to upper-air temperature and is also available through the NWS and the FAA circuits. In particular, the NWS periodically releases weather balloons which carry instrumentation packages called radiosondes aloft to provide pressure, temperature and moisture information at "mandatory", i.e., at the earth's surface, and at altitudes where air pressure values of 1,000, 850, 700, 500, 400, 300, 250, 200, 150, and 100 millibar exist, as well as at "significant" intermediate levels. Because this radiosonde information only becomes available at 12-hour intervals and because upper-atmospheric temperatures can easily change significantly over this 12-hour period, there is always a likelihood that the change will be enough to make the vertical cloud profiles being generated obsolete. To obviate this problem, in accordance with the present invention, a further input to the processing algorithm is an objective analysis of observed upper-air temperatures generated at many equidistant points. Next, access to the NWS forecast model information is obtained and the results are utilized in conjunction with the aforementioned data fields in forecasting the changes in temperature expected from the observed values.

A fifth input to the processing algorithm are water temperature measurements of large bodies of water (i.e., the Great Lakes, Atlantic Ocean, etc.) The water temperatures are utilized by the cloud detection algorithm, over bodies of water, described below.

Thus, with continued reference to FIG. 1, the processing algorithm of the present invention utilizes actual GOES monitored cloud temperature information, surface weather observations at plural points within a region and forecasted upper-air temperature profiles to arrive at an enhanced cloud image as compared to what can be realized utilizing only the GOES IR data.

A sixth input to the processing algorithm are surface elevations above mean sea level (AMSL). The surface elevations are used to ensure accurate calculation of cloud base/top altitudes. The forecast environmental temperatures at known altitudes AMSL are assembled along with a surface temperature. A cloud temperature is compared against the environmental temperatures and, through interpolation, the precise altitude AMSL of the cloud can be determined. The surface elevation AMSL is required for maximum precision.

Referring next to FIG. 2, there is set out a general block diagram of the processing steps comprising the method of the present invention. Being a general block diagram, it should be understood that each of the steps labeled 1.0 through 7.0 actually comprises a number of substeps which, themselves, are set out in greater detail in FIGS. 3 through 20 of the drawings.

As indicated in block 1.0, the first step in the processing algorithm is to transform the GOES satellite data from satellite coordinates into a Cartesian coordinate representation and, specifically, a Lambert Conformal projection. The transformation itself is accomplished using commercially available software developed by the Control Data Corporation of Minneapolis, Minnesota, as a part of its Advanced Meteorological Image and Graphics Analysis System (AMIGAS). This software takes into account navigational information including the orbit, attitude and gamma information embedded in the GOES satellite navigation data, to compute image-to-earth coordinate transforms for any and all images received from the satellite on a particular day in a Cartesian coordinate format. This greatly enhances the ability of the computer to further manipulate the data when it is considered that the other data on surface weather and weather aloft is provided in a gridded format of similar coordinate representation.

Rather than merely rely upon the IR temperature data supplied by the GOES satellite in identifying cloud formations, in the method of the present invention, a number of thermodynamic parameters are factored into the processing operations. The real-time combination of satellite imagery with high-resolution surface thermodynamic parameters is used not only to help determine the existence of cloud formations, but also to determine the height to the cloud base. More particularly, in the method of the present invention, a calculation is made of the exact surface air temperature and surface dew point temperature at each of 640×480 points within a defined region. Next the LCL temperature is computed. The LCL temperature represents the theoretical warmest temperature a cloud can exist at in the atmosphere at that point in time and space based on the current surface conditions and standard upper-atmospheric conditions. The satellite sensed IR temperature is compared with an air/cloud temperature cutoff threshold computed utilizing the LCL temperature, the surface temperature and the surface dew point temperature. If the satellite temperature is sufficiently colder than the air/cloud temperature cutoff, the conclusion is made that a cloud is present. Over bodies of water, the air temperature value is replaced with the observed water temperature.

While the GOES provides both visible spectrum imagery and IR imagery, the present invention utilizes only the IR imagery which allows the consistent 24-hour generation of enhanced cloud imagery. In assembling the thermodynamic parameters (FIG. 2, step 2.0), the facilities of the NWS and the FAA are relied upon to provide hourly weather observations from over 2,000 North American locations with temperature and dew point measurements being the primary surface weather observations required for performing the cloud imagery enhancements. Coded information from the NWS sites is fed into the NMC facility in Suitland, Md., and made available on a subscription basis to interested parties. Likewise, the FAA receives weather information from various airports across the country and it is funneled through the FAA facility in Kansas City and made available on the FAA 604 data link to subscribers as well.

Not only are surface conditions taken into account, but also the algorithm of the present invention relies upon upper-atmospheric data from radiosondes and forecasts based thereon to construct vertical profiles of upper-air temperatures. Just how those parameters are employed in the method of the present invention will become more apparent as the description continues.

The next step in the process (step 3.0) is to establish, on a pixel-by-pixel basis whether, in fact, a cloud is present. Because it is known that clouds are typically colder than the LCL and the surface air temperature beneath them and because cloud-top temperature information is available from the GOES IR satellite imagery and the surface air temperature and surface dew point temperature information is available through the NWS and FAA 604 circuits and are transformed into precise values at gridded locations, a computation can be made to establish whether or not a cloud exists at any given location with the 640×480 pixel domain. Please note that special cloud determination processing is performed over water. Certain instances may occur where clear skies over a very cold body of water (i.e., Lake Superior) surrounded by warm land surface temperatures could be misinterpreted as being a low cloud or fog bank. The consideration of water temperatures precludes this from happening.

Once it is determined that clouds exist at a particular location, the vertical characteristics of those clouds are determined (step 4.0). As already mentioned, the cloud-top temperature can be related to the clouds vertical height. To assess the height of the cloud's base, however, the temperature of the LCL is further utilized. Also a part of the vertical characteristics of clouds is whether there exists any over-shoot of the cloud top through the tropopause, typically, a good indicator of severe weather and/or extreme turbulence.

Having determined where the cloudy areas exist as well as the vertical characteristics of those clouds, the next step in the process (step 5.0) is to generate individual pseudo-cloud columns at each of the possible pixel locations. Because the base temperature and top temperature of those cloud columns have already been determined (step 4.0), a display brightness count can be assigned to each and then intermediate brightness counts can be arrived at through linear interpolation. In the approach used, there are 64 possible shades of gray corresponding to the count values with the whiter shades being reserved for the higher altitudes and the grayer or darker shades for the lower altitudes. By filling the cloud columns with brightness values that are a function of cloud height, a more realistic representation of cloudiness in the atmosphere can be depicted.

Once the individual pseudo-cloud columns have been generated for all pixel locations, the next step is to construct a 3-D image thereof (step 6.0). This is accomplished by writing out an entire line of vertical cloud columns beginning at the top of the image (line 1) and then incrementing the line count to move downward in the image and writing out successive lines of vertical cloud columns and overwriting any previous information. This process is continued until all 480 lines comprising a frame have been treated. Then, to reduce the ultimate data transmission load, a standard 6-bit, run-length encoding compression technique is used to avoid the necessity of transmitting strings of serial identical data.

To provide an improved 3-D viewing perspective with a curved "horizon", a scale and rotate algorithm is executed with the transformation factors being chosen such that the X (right-left) orientation of the image is held constant from front to back while tilting it about its bottom input image line axis to an angle of 30°. The Y (top-bottom) orientation of the image is changed in the output image such that pseudo-cloud columns are positioned lower on the output image as the edge of the display is approached. A further lowering of the output image display position is calculated as the right/left edges of the display are approached. This technique, utilizing equations of a circle, produces a curved-horizon presentation in the output image providing the viewer a sense of seeing the clouds from outer space. This effectively enhances the perception of depth to the image (step 7.0). Furthermore, by processing the image, one line at a time, from top to bottom, the pseudo-cloud columns in the background are effectively overwritten, providing more prominence to pseudo-cloud columns in the foreground, thus providing a visual illusion of depth. The final step in the construction of the 3-D image is the application of the imagery to an image processing technique called convolution. This post-processing step effectively enhances certain cloud features and renders a more realistic image. The convolution process is explained in greater detail later in this document.

FIG. 3 illustrates by means of a flow diagram the operations used in transforming the 2-D GOES satellite data into Cartesian coordinates. As indicated in block 1.1, the GOES provides infrared (temperature) information in terms of 8-bit brightness or radiance counts. Specifically, the data stream supplied by the National Environmental Satellite Data and Information Service (NESDIS) provides the brightness counts in a satellite image coordinate presentation. Embedded within the NESDIS data stream is all of the necessary "navigation" parameters which are also required to perform transformations between satellite image coordinates and various other coordinate systems. The basic "navigation" information that allows such transformations consists of (1) satellite characteristics, such as spin rate, number of elements per line, data resolution, etc. and (2) navigation parameters which consist of orbit and attitude of the satellite, as well as information regarding east-west centering of the earth in the image frame. Because the orbit of the GOES is not perfect, the navigation parameters may change with each image and must be updated accordingly. The commercially-available AMIGAS software used in carrying out steps 1.1 and 1.2 in FIG. 3 utilizes the navigation parameters embedded in the GOES data stream to perform "quick navigation" as that term is used in the descriptive software support publications available through CDC, the supplier of the AMIGAS software.

In remapping the image data from satellite image projection into a Lambert conformal projection (step 1.3), a display is created where at the center of the display, north is always at the top of the screen, east to the right, west to the left and south at the bottom. This is a more usable display, obviating the need for the viewer to subjectively compensate for the inherent image distortions near the earth edge. Thus, by converting the satellite image data to Cartesian coordinates user interpretation of the display is facilitated.

The operations involved in assembling the thermodynamic parameters (step 2.0 in FIG. 2) are further expanded with reference to FIGS. 4 through 8 of the drawings. As illustrated in FIG. 4, the thermodynamic parameters involved include (1) surface conditions, (2) upper-air conditions and (3) water temperatures for large bodies of water. Each of these operational steps is further broken down into a series of substeps reflected in FIGS. 5 through 8.

As mentioned earlier, the surface weather conditions include surface air temperatures and dew point temperatures obtained from fixed geographical locations throughout the country and supplied on the NWS domestic circuit and the FAA 604 circuit. Where it is desired to obtain either surface air temperature or dew point temperatures at locations other than those being directly reported by the NWS or FAA, a bilinear interpolation of the SURECAST TM gridded fields is executed. More particularly, the four previously calculated temperature grid point values and the four previously calculated dew point temperature grid point values surrounding an intermediate pixel location are utilized in a bilinear interpolation algorithm to determine the exact surface air temperature and the exact dew point temperature at that pixel location. In this way, the surface weather conditions at intermediate locations within a region can be established with considerable precision from the weather data that is available at four gridded locations surrounding the particular location in question.

In creating a raster scan display for video presentation, an input image is considered to comprise a matrix of 307,200 separate and distinct elements or points arranged 640 across and 480 down. There are, of course, many fewer actual grid points available from the temperature objective analysis field. By using a high speed computer running the bilinear interpolation algorithm, the surface temperature and dew point temperature at each of the 307,200 points can be computed on a real-time basis.

In much the same manner, the current upper-air vertical temperature profiles can be computed. With reference to FIG. 6, those skilled in the art are aware that the NWS, at 12-hour intervals, releases weather balloons carrying a radiosonde instrumentation package which radios back to earth pressure (geopotential height), temperature and moisture information from a plurality of "mandatory" pressure levels, namely at the surface and at the 1000, 850, 700, 500, 400, 300, 250, 200, 150 and 100 millibar pressure levels. The term "significant" levels refers to important changes encountered between the mandatory levels and they vary with every report provided. To obtain temperature information in between the telemetered mandatory and significant levels, a log-pressure interpolation is made to generate an indication of current temperatures at any level in question.

In that the availability of radiosonde data only occurs at 12-hour intervals and given the fact that upper-air conditions can change significantly over such a long period of time, improved accuracy is achieved by also retrieving from the NMC in Suitland, Md., the 12-hour forecast temperatures for each of the mandatory reporting levels. The initial temperatures are calculated by interpolation of the actual mandatory and significant radiosonde data. Next, a calculation is made to derive the forecast rate of temperature change for each mandatory level. Following that, the forecast rate of temperature change so computed is applied to the corresponding initial radiosonde-derived temperatures at eleven discrete levels to create the "current" temperature profile for each image period.

Next, this temperature profile is scanned in order, from lowest to highest altitude, to determine if a temperature "inversion" exists within it. A temperature inversion is said to exist whenever the temperature increases with increasing altitude between any two adjacent levels. If an inversion is found within the profile, it is removed by decreasing the temperature at the higher altitude to a point where it is cooler than the temperature at the lower altitude. The scan then continues to check the remainder of the profile, removing any other inversions that exist within it, in order to produce a profile where the temperature continually decreases from the bottom altitude through the top.

To establish the "cloudy" areas within a region (step 3.0), the further operations set out in FIGS. 9 and 10 are performed in the sequence indicated. The software is operating to determine for every pixel location if, in fact, a cloud is present. Referring to step 3.1 in FIG. 9, those skilled in the art appreciate that the LCL is the level in the atmosphere at which condensation will occur in an air parcel that has been lifted. Specifically, the LCL temperature represents the temperature of the theoretical cloud base. Following that, the air/cloud temperature cut-off is established. Over land areas, the cutoff temperature is set dependent upon the time of day in relation to sunrise/sunset times, surface air temperature, surface air dew point and LCL. Over water, the time of day dependence does not apply. This method of cloud determination allows relatively warm summertime cumuliform cloudiness to be detected and yet does not produce erroneous low clouds on clear, cool nights when the satellite sensed IR temperature may, in fact, be cooler than the observed surface air temperature. Thus, by looking at the LCL temperature, the surface air temperature, the surface dew point temperature and the time of day in relation to sunrise/sunset, a determination is made as to how cold it would have to be for a cloud to exist. If the temperature that is observed from outer space is sufficiently cold, i.e., is as cold as the cut-off temperature or colder, then the algorithm determines that a cloud is present. With reference to FIG. 10, over large bodies of cold water, it might normally be possible to mistake the cold satellite sensed IR temperatures of the water (with clear sky conditions) as clouds. The algorithm of this invention compensates for this by utilizing water temperature information, updated on a regular basis and available from coastal observation stations and buoys. These water temperature reports, received over the NWS circuits, take the place of the air temperature int eh cloud determination section over water.

Referring next to step 3.3, when it is considered that the satellite sensed IR data or brightness counts correspond to discrete temperatures, a table look-up operation si conducted to determine the corresponding temperatures in degrees Centigrade at differing altitudes. Set forth below in tabular format is a portion of the conversion table which converts IR radiance into black-body temperature.

TABLE I

| Brightness Count | Temp. °C. |
| --- | --- |
| 00000000 | 70.0 |
| 00000001 | 56.0 |
| 00000010 | 56.0 |
| 00000011 | 55.0 |
| . | . |
| . | . |
| . | . |
| 10000000 | −7.2 |
| . | . |
| . | . |
| 11111111 | −96.0 |

Having established both the temperature of the LCL, the air/cloud temperature cutoff and the temperatures at various altitudes, a cloud/no-cloud determination can be made, as previously described based on the surface air temperature, surface dew point temperature, LCL temperatures, water temperatures (over water areas) and time of day (over land areas).

In regards to the computation of the LCL, the temperature in degrees Centigrade of the LCL is a function of surface air temperature and surface dew point temperature. If it is determined that the air temperature is less than the temperature of the LCL, then the two are set equal. The program determines that cloudiness exists if the temperature of the cloud is less than or equal to the calculated temperature cutoff value and the temperature of the cloud is less than or equal to the temperature of the LCL and the pixel in question is located over land (not water). The calculation of the LCL may be expressed by the following FORTRAN statements:

Calculate temperature of LCL

SVAR = TCAIR − TCDEW

TVAR = TCAIR

TCLCL = SVAR * (1.2185 + 0.001278 * TVAR + SVAR * (−0.002190 + 11.73E-6 * SVAR − 5.20E-6 *TVAR)

TCLCL = TVAR − TCLCL

IF (TCAIR.LT.TCLCL) TCAIR = TCLCL

IF (over water) TCAIR = TCWATER
where
TCAIR is temperature of air in degrees C
TCDEW is dew point in degrees C
TCLCL is temperature of LCL FIG. 13 illustrates the substeps executed in the determination of vertical characteristics of a cloud (step 4.0). Using the aforementioned look-up table, the satellite IR brightness counts are converted to temperatures representing the cloud top temperature values. The cloud base temperature (step 4.2) is set equal to the temperature of the LCL as previously computed. The altitude of the cloud base and normal cloud tops are arrived at by performing a log interpolation of cloud temperature between adjacent profile temperature levels by executing the following short FORTRAN routine:

DATA SHGT/1, 6000, 9000, 12000, 180000, 24000, 30000, 34000.

-continued

```
39000, 45000, 53000/
OUTHGT = 0
IF (elevation.LT. 6000) THEN
    Bottom = 1
else IF (elevation.LT.9000) THEN
    Bottom = 2
else IF (elevation.LT.12000) THEN
    Bottom = 3
else
    Bottom = 4
end if
UPATEMP(bottom) = TCAIR
SHGT (bottom) = elevation
DO 100 I = 2,11
    IF (UPATEMP(I).LE.TCLOUD) THEN
        TEMPA = UPATAEMP(I)
        TEMPB = UPTAEMP(I-1)
        HGTA = SHGT(I)
        HGTB = SHGT(I-1)
        TEMPM = TCLOUD
        HGTM = EXP(ALOG(HGTA)-
            (ALOG(HGTA)-ALOG(HGTB))*
            (TEMPA-TEMPM) / (TEMPA-TEMPB)
        OUTHGT = NINT(HGTM*100)
        RETURN
    END IF
100 CONTINUE
```

In the above routine, the first line comprises the sampling heights at the surface and at altitudes of 6,000 ft., 9,000 ft. ... 53,000 ft. Using this interpolation algorithm, the cloud temperature between two known temperatures is arrived at. The surface elevation AMSL is used to accurately set the lowest level altitude within the vertical profile.

As set out in step 4.6 of FIG. 13, the altitude of convective overshooting cloud tops is determined in accordance with the following:

When the cloud-top temperature is colder than the coldest profile temperature, the coldest profile temperature is decremented at a rate of 3° C. per 1,000 ft. until the cloud-top temperature is reached. It has been found that if a straight-forward extrapolation approach were to be used, an erroneous result would be reached because the cloud height becomes grossly exaggerated. In a thunderstorm situation, when the cloud tops reach the tropopause and very vigorous convection occurs, the cloud tops sometimes overshoot and become very cold due to the high rate of evaporative cooling taking place. Rather than merely extrapolating to determine a height value based strictly on temperature, the program effectively "lifts" a cloud parcel at the dry adiabatic lapse rate which is the rate at which a near moisture-free air parcel will cool as it is elevated. Starting at the top of the profile (53,000 ft.), for every 1,000 ft. above that level, 3° is subtracted from the 53,000 ft. profile temperature until the satellite observed cloud-top temperature is reached. The AMSL of the over-shooting cloud top is then established.

The flow diagrams of FIGS. 14 through 17 illustrate the computational steps carried out by the program for generating individual pseudo-cloud columns (step 5.0 in FIG. 2).

Figure 16:
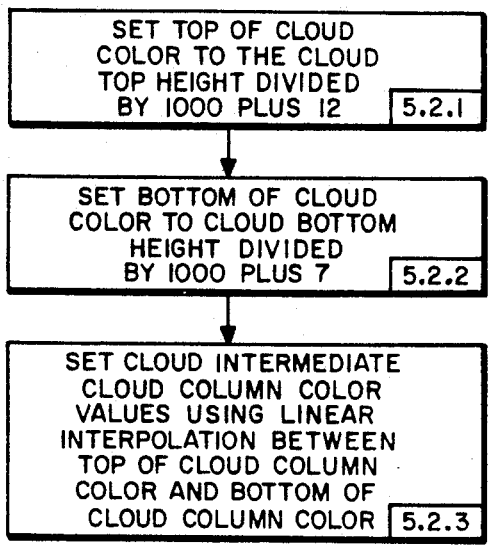
FIG. 16 is a more detailed block diagram of the operational steps used in carrying out step 5.2 in FIG. 14.

Once the cloud-top and cloud-base altitudes have been determined at all pixel locations, color values are assigned in accordance with FIG. 16. That is, the display color of the cloud top is arrived at by dividing the cloud-top height by 1,000 and adding 12. The cloud base display color is arrived at by dividing cloud-base height by 1,000 and adding 7. Thus, for example, if it is determined that the cloud-top height of a particular cloud column above a given pixel location is 20,000 ft., it would be assigned a display color value of 32 (20+12). Likewise, if the cloud base is at an altitude of 4,000 ft., it would be assigned a display color value of 11 (4+7). Then, using linear interpolation, display color values are applied to the intermediate levels of the cloud column. Step 5.1.2 depicts the control of the vertical sizing of resultant columns using a 640×480 pixel screen, and when using the size of the geographical areas that is normally employed (28° longitude width), it has been found that no matter what size or height a cloud feature, it is best represented as having a vertical scale of 1.725 pixels per 1000 feet. In other words, a 17,500 ft. thick cloud would occupy 10 vertical pixels on the display screen.

To further enhance realism, cloud base colors are dynamically darkened as large convective clouds grow. The bases of cloud columns thicker (from top to base) than 10,000 feet and with cloud bases below 5,000 feet AMSL are darkened one color count per 10,000 feet of cloud thickness. For example, the cloud base of a cloud column with a base of 4,000 feet AMSL and top 34,000 feet AMSL (30,000 feet thick) will be darkened three additional color values.

Figure 18:
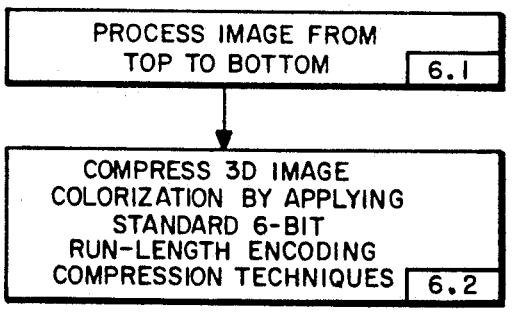
FIG. 18 is a more detailed flow diagram of the operational steps used in carrying out step 6.0 in FIG. 2.
Figure 19:
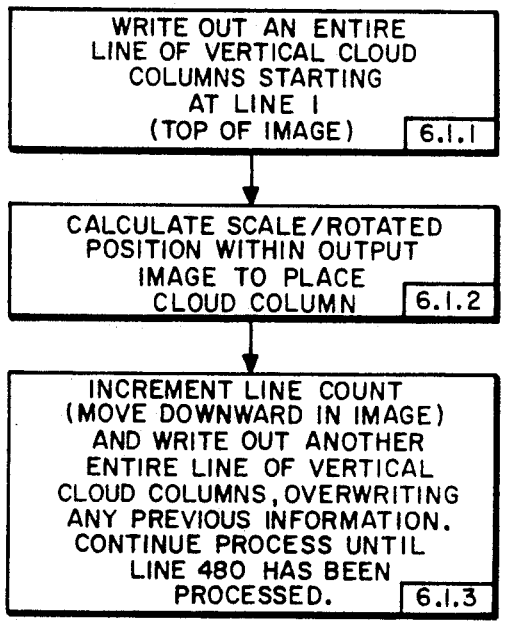
FIG. 19 is a more detailed flow diagram of the operational steps used in carrying out step 6.1 in FIG. 18.
Figure 20:
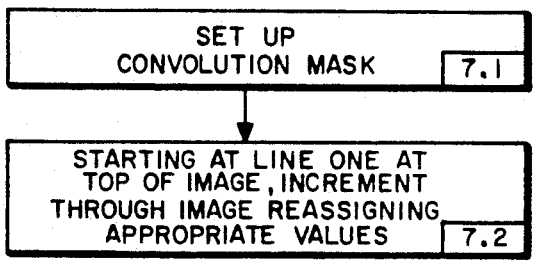
FIG. 20 is a more detailed block diagram of the operational steps used in carrying out the operation of step 7.0 in FIG. 2.

Once the pseudo-cloud columns have been generated for each pixel location and assembled into memory in a raster scan format, they can be read out for display in accordance with the flow diagrams of FIGS. 18 and 19. The scale and rotate algorithm then effectively tips the display back at an angle of 30°, to fill less than the entire screen and leaving the impression of a curved "horizon" between cloud tops and outer space increasing the impression of depth.

Finally, the scaled and rotated image is subjected to a convolution image processing algorithm (FIG. 20) that further enhances cloud edges and, in this application, produces an effect of a artificial light source shining the clouds from the west.

Convolution is an area process used in image processing applications as a means of highlighting or suppressing certain aspects and/or features of a digital image. The process employed in this application uses a 3×3 matrix (called a mask or kernel) of predetermined values which then is applied over the digitized image (the center element of the matrix corresponds to the current pixel on the image being analyzed). The process then calculates the weighted sum of all the surrounding neighbors multiplied by their relative partner in the convolution matrix. From this weighted sum, the determination is made as to what features are suppressed or highlighted at that position in the image. With the appropriate 3×3 matrix, certain features can be extracted from the image and then added back into the original. The resulting output image is the original image, plus the highlighted features.

The convolution used in the production of 4-D satellite imagery consists of a 3×3 mask with the following values:

$$\text{mask} = \begin{bmatrix} -1 & 0 & 1 \\ -1 & 0 & 1 \\ -1 & 0 & 1 \end{bmatrix}$$

The weighted sum produced by convolution for a given pixel is scaled according to its original value. Original values greater than or equal to 33 are scaled by dividing the weighted sum by 1.2, while the weighted sum for those original pixels under 33 are divided by 1.7. The scaled weighted sums are then added into the original image, completing the convolution process. The flexibility also exists to adjust these scalars at any time in order to fine-tune the finished image.

Figure 21:
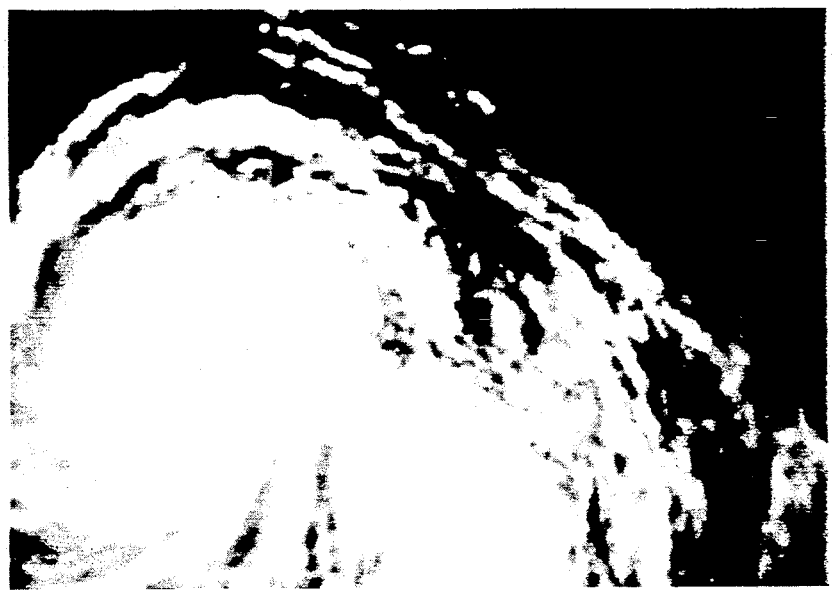
FIG. 21 is a photograph of satellite cloud images using prior art display techniques.
Figure 22:
FIG. 22 is a photograph of cloud images created using the method of the present invention.
Figure 23:
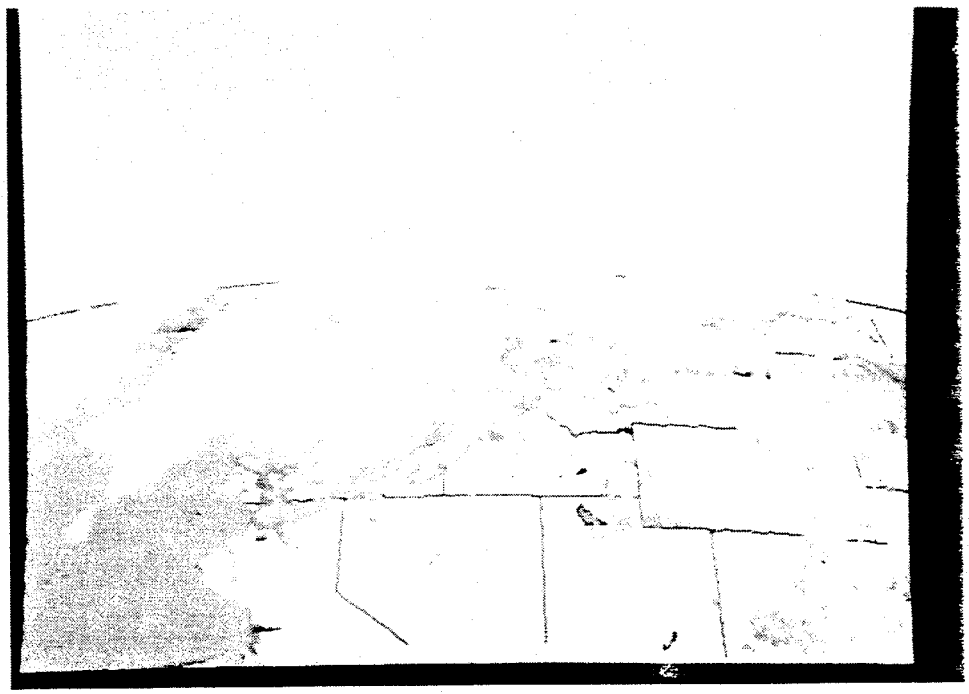
FIG. 23 is a photograph of cloud images using the method of the present invention when a 3-D viewing perspective with a curved horizon is generated.

The photos of FIGS. 21 and 22 provide a comparison between normal satellite imagery of the prior art and the cloud imagery obtained using the method of the present invention. Where the prior art satellite imagery tends to present a flat two-dimensional display, the method of the present invention, by effectively providing shading as a function of cloud height, yields the illusion of depth and more of a "pilot's eye view". When time lapse techniques are employed, movement patterns including the clouds building-up and churning supplies significantly greater amounts of information, at a glance, to meteorologists, thereby enhancing their ability to make more accurate forecast presentations.

It is seen then that the method of the present invention allows GOES imagery to be enhanced by combining it with tropospheric thermodynamic profiles, surface-based weather observations and sea surface temperature information so as to create strikingly realistic computer-generated 3-D pseudo-cloud images.

Those skilled in the art will be able to implement the method of the present invention from the detailed flow charts and explanation provided herein. Accordingly, it is deemed unnecessary to include herewith the specific machine code comprising the satellite cloud image enhancement program which, of course, will vary depending upon the computing system on which the software is actually run.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method of enhancing two-dimensional IR satellite sensor cloud information for presentation on a raster scan display screen comprising the steps of:
    (a) sampling and storing two-dimensional IR sensed cloud image radiance information pertinent to a predetermined geographical region from a geostationary orbit meteorological satellite in a memory of a general purpose digital computer;
    (b) sampling and storing earth surface weather related information for said predetermined geographical region from multiple sources in said memory;
    (c) sampling and storing current and forecasted upper-air temperature information obtained from radiosonde instruments at mandatory and significant altitude levels above said geographical region;
    (d) storing in said memory of said digital computer information relative to the elevation above means seal level of the earth's surface in said predetermined geographical region;
    (e) processing the stored information sampled in steps a, b, c and d to create cloud image raster scan signals exhibiting three-dimensional characteristics of said IR satellite sensor cloud information; and
    (f) applying said raster scan signals to a visual display device.

2. A method for enhancing IR satellite sensor cloud information for later presentation on a raster scan display screen comprising the steps of:
    (a) sampling two-dimensional IR sensed cloud image brightness count information pertinent to a predetermined geographical region from a geostationary orbit meteorological satellite and storing in a memory of a general purpose digital computer;
    (b) transforming said satellite image-coordinate IR brightness count information to Cartesian coordinate format in said digital computer;
    (c) assembling surface weather data for gridded locations within a predetermined geographical region from a plurality of publicly available sources and storing same in said memory;
    (d) extrapolating the surface weather data assembled and stored in step (c) for a plurality of pixel locations within said geographical region;
    (e) assembling upper-air temperature data from National Weather Service (NWS) radiosonde transmitted information for a plurality of discrete altitude levels at plural locations within said region and storing same in said memory;
    (f) extrapolating the upper-air temperature data assembled in step (e) for altitudes intermediate said discrete altitude levels and for each of said plurality of pixel locations within said geographical region;
    (g) computing from the extrapolated data obtained in steps (d) and (f) a temperature for a Lifted Condensation Level at each of said pixel locations;
    (h) determining from the computer temperatures of step (g) a presence or absence of clouds at each of said pixel locations;
    (i) determining for each pixel location where clouds are determined to be present in step (h) a vertical temperature characteristics of said clouds at a plurality of altitudes;
    (j) converting said vertical temperature characteristics of said clouds at each pixel location as determined by step (i) into digitally-encoded, multi-bit words representative of color shades at each of said plurality of elevations in a raster scan format; and
    (k) presenting said digitally encoded color shade data on a video display terminal.

3. The method as in claim 2 wherein said surface weather data assembled and stored includes surface air temperature, dew point temperature and surface elevation information.

4. The method as in claim 3 wherein said surface weather data assembled and stored further includes water temperatures of predetermined bodies of water.

5. The method as in claim 3 wherein said surface air temperature and dew point temperature are broadcast through the facilities of the National Weather Service Domestic circuit and the Federal Aviation Agency 604 circuit.

6. The method as in claim 2 wherein the step of extrapolating said surface weather data includes performing a bi-linear interpolation of said surface weather data for all pixels surrounded by a group of four of said gridded locations.

7. The method as in claim 2 wherein said step of assembling and storing in said memory upper-air temperature data further includes:
    (e-1) retrieving forecasted temperatures at said predetermined discrete altitudes;

(e-2) computing the forecasted rate of temperature change for each of said predetermined discrete altitudes; and (e-3) continuously modifying said upper-air temperatures at said discrete locations in accordance wit the forecasted rate of temperature change computed in step (e-2).

8. The method as in claim 2 wherein said step of determining for each pixel location the vertical temperature characteristics of clouds at a plurality of altitudes includes the steps of:

(i-1) computing temperature values for cloud tops as a function of the GOES brightness count digital data;

(i-2) assigning the temperature computed in step (g) to the cloud base;

(i-3) interpolating the altitude of said cloud base and normal cloud tops between known altitude levels; and (i-4) computing the altitude of any connective overshooting cloud tops.

9. The method as in claim 2 and further including the steps of:

(a) establishing a convolution mask of predetermined numeric values;

(b) calculating a weighted sum of each pixel on the image being analyzed with a numeric value in said mask; and (c) substituting the calculated value determined in the immediately foregoing step for each pixel of the image on a line-by-line basis.

10. A method for enhancing IR satellite sensor cloud information for later presentation on a raster scan display screen comprising the steps of:

(a) sampling and storing two-dimensional, satellite image-coordinate, IR brightness count digital data streams from a geostationary orbit meteorological satellite into the memory of a general purpose digital computer;

(b) transforming said satellite image-coordinate IR brightness count digital data to Cartesian coordinate format in said digital computer;

(c) assembling grid-point locations within said predetermined geographical region from a plurality of publicly available sources and storing same in said memory;

(d) extrapolating the surface weather data assemble and stored in step (c) for each pixel location within said geographical region;

(e) retrieving current mandatory and significant level radiosonde temperature data;

(f) generating grids of radiosonde temperatures at predetermined levels in the atmosphere;

(g) retrieving National Meteorological Center forecast temperature grids at the predetermined levels established in step (f);

(h) computing a forecasted rate of change of temperature at each of said predetermined levels and at each of said grid-point locations;

(i) modifying the radiosonde temperatures at each of said predetermined levels and grid-point locations by the computer forecasted rate of change of temperature obtained in step (h) to yield a "current" grid-point value of temperature at altitudes intermediate said predetermined levels to yield a current temperature profile;

(j) extrapolating said "current" grip-point value of temperature at altitudes intermediate said predetermined levels to yield a current temperature profile;

(k) computing form the extrapolated data obtained in steps (d) and (j) the temperature of the Lifted Condensation Level at each of said pixel locations;

(l) determining from the computer temperatures of step (k) the presence or absence of clouds at each of said pixel locations;

(m) determining for each pixel location where clouds are determined to be present in step(1) a vertical temperature characteristics of said clouds at a plurality of altitudes;

(n) converting said vertical temperature characteristics of said clouds at each pixel location as determined by step (m) into digitally-encoded, multi-bit words representative of color shades at each of said plurality of elevations in a raster scan format; and (o) presenting said digitally encoded color shade data on a video display terminal.

11. The method as in claim 10 wherein said step of computing the forecasted rate of change of temperature at each of said predetermined levels and at each of the grid-point locations comprising:

(a) determining the number of time periods of predetermined length within the time interval between successive National Meteorological Center forecast times;

(b) calculating the change in temperature from a first forecast to a next forecast at each of said grid-point locations and at least of said predetermined levels; and (c) dividing the temperature change calculated in step (b) by the number of time periods determined in step (a).

12. The method of claim 10 and further including the step of eliminating temperature inversions within the "current" temperature profile developed in step (j).

13. The method as in claim 12 wherein said step of eliminating temperature inversions includes:

(a) comparing temperature at one predetermined level with temperature at a next higher extrapolated level to determine if temperature at said next higher extrapolated level is less than that at said one predetermined level; and (b) determining if altitude of said one predetermined level is less than a predetermined fixed altitude value and, if so, changing the temperature at next high extrapolated value to that at said one predetermined level plus a first fixed temperature increment but if said altitude is greater than said predetermined fixed altitude changing the temperature at said next higher extrapolated value to that at said one predetermined level plus a second predetermined increment greater than said first predetermined increment.

14. The method as in claim 10 wherein step (n) comprises the further steps of:

(n-1) determining the cloud top height in feed at each of said grid-point locations (n-2) setting the color value of cloud top to cloud top height/1000+12

(n-3) determining the could bottom height in feet at each of said grid-point locations (n-4) setting the color value of the cloud bottom to cloud bottom height/1000+7

(n-5) setting intermediate cloud color values using linear interpolation between a top-of-cloud column color value and bottom-of-cloud column color value (n-6) computing the thickness of each cloud column (n-7) decrementing cloud bottom color value by a quantity that is proportional to a computed cloud thickness if said cloud bottom height is less than a predetermined minimum altitude above mean sea level.

15. The method as in claim 10 wherein step 1 comprises the steps of:
   (1-1) calculating the temperature of lifted condensation level;
   (1-2) establishing an air/cloud temperature cut-off;
   (1-3) converting infrared radiance into black body temperature; and
   (1-4) determining the presence of clouds from the temperature calculated in step (1-1) and the time of day.

* * * * *

UNITED STATES PATENT AND TRADEMARK OFFICE
CERTIFICATE OF CORRECTION

PATENT NO. : 5,255,190
DATED : October 19, 1993
INVENTOR(S) : Ronald J. Sznaider It is certified that error appears in the above-indentified patent and that said Letters Patent is hereby corrected as shown below:

Column 13, line 61, change "means" to -- mean --.

Column 15, line 43, after "assembling" insert -- surface weather data for --.

Column 16, line 7, change "computer" to -- computed --.

Column 16, line 59, change "feed" to -- feet -.

Column 16, line 63, change "could" to -- cloud --.

Signed and Sealed this

Fifth Day of April, 1994

Attest:

BRUCE LEHMAN

Attesting Officer

Commissioner of Patents and Trademarks